(12) United States Patent
Figgs et al.

(10) Patent No.: US 11,828,371 B2
(45) Date of Patent: Nov. 28, 2023

(54) BALL DESIGN CLAPPER ASSEMBLY

(71) Applicant: SPM Oil & Gas Inc., Fort Worth, TX (US)

(72) Inventors: David T. Figgs, Fort Worth, TX (US); Justin Poehls, Glen Rose, TX (US)

(73) Assignee: SPM Oil & Gas Inc., Forth Worth, TX (US)

( * ) Notice: Subject to any disclaimer, the term of this patent is extended or adjusted under 35 U.S.C. 154(b) by 0 days.

(21) Appl. No.: 17/673,446

(22) Filed: Feb. 16, 2022

(65) Prior Publication Data

US 2023/0258274 A1 Aug. 17, 2023

(51) Int. Cl.
*F16K 15/03* (2006.01)

(52) U.S. Cl.
CPC .................. *F16K 15/034* (2021.08)

(58) Field of Classification Search
None
See application file for complete search history.

(56) References Cited

U.S. PATENT DOCUMENTS

| | | | |
|---|---|---|---|
| 2,888,036 A * | 5/1959 | Reppert | F16K 1/226 251/298 |
| 2,925,827 A * | 2/1960 | Anderson | F16K 15/03 137/527.4 |
| 3,062,232 A * | 11/1962 | McGay | F16K 15/1821 137/496 |
| 3,075,547 A * | 1/1963 | Scaramucci | F16K 15/03 137/527.2 |
| 3,143,136 A | 8/1964 | Wheatley, Jr. | |
| 3,414,232 A * | 12/1968 | Hellman | F16K 1/482 251/86 |
| 3,857,408 A | 12/1974 | Rhodes et al. | |
| 3,934,608 A * | 1/1976 | Guyton | F16K 15/03 137/527.8 |
| 5,135,025 A * | 8/1992 | Mackal | F16K 15/205 137/541 |
| 6,668,858 B1 | 12/2003 | Bazargan | |
| 7,152,622 B2 | 12/2006 | Scaramucci et al. | |
| 7,897,084 B2 | 3/2011 | Ichikawa et al. | |
| 8,128,058 B2 * | 3/2012 | Quinn | F16K 1/2028 251/83 |
| 9,222,406 B2 * | 12/2015 | Lombard | F02B 37/183 |
| 10,753,490 B2 * | 8/2020 | Fuller | F16K 47/00 |
| 2014/0096675 A1 * | 4/2014 | Fletcher | F15B 15/28 91/1 |
| 2019/0316694 A1 | 10/2019 | Glaes | |
| 2021/0372536 A1 * | 12/2021 | Crawford | F16K 15/03 |

\* cited by examiner

*Primary Examiner* — Angelisa L. Hicks (57) ABSTRACT

A valve assembly includes a valve body defining an internal region, an inlet passageway, and an outlet passageway, wherein the inlet and outlet passageways fluidly communicate with the internal region. A valve seat is positioned within the internal region defining a fluid passageway. A hanger is connected to the valve body. A linkage assembly is pivotally and rotatably to the hanger and a valve member is pivotally connected to the hanger via the linkage assembly, wherein the valve member is movable between an open configuration, in which fluid flow is permitted through the fluid passageway, and a closed configuration, in which the valve member engages the valve seat to at least partially restrict fluid flow through the fluid passageway.

20 Claims, 6 Drawing Sheets

BALL DESIGN CLAPPER ASSEMBLY

TECHNICAL FIELD

The present disclosure relates to valve assemblies and, in particular, clapper valves used in oil and gas operations.

BACKGROUND

In oil or gas operations, such as, for example, the fracturing or gravel packing of a subterranean wellbore, a clapper valve may be used to control the flow of fracturing and/or gravel-packing fluids. A clapper valve permits fluid flow in a first direction, but prevents, or at least reduces, fluid flow in a second direction, which is generally opposite the first direction. Any vibration caused by, for example, turbulence in the flow of fluid through the clapper valve, often produces significant wear to the internal components of the clapper valve. Moreover, the effectiveness of the clapper valve in preventing, or at least reducing, fluid flow in the second direction is often diminished as a result of improper alignment and/or excessive loading of the internal components of the clapper valve. Such issues typically cause premature deterioration of the clapper valve. Further, to address some of the above, clapper valves are often designed to permit a limited amount of freedom of movement in order to self-align and seal. However, some methods of designing for the desired amount of freedom of movement also leads to the wear of parts that are moved relative to each other during turbulent flow, for example. There is a need for an apparatus, system, assembly, or method to address one or more of the foregoing issues, and/or one or more other issues. Devices according to the disclosure satisfy the need.

U.S. Patent Application Publication No. 2019/0316694 discloses a check valve assembly with a valve body receiving a valve plate. The valve plate is adapted to pivot between a first open position in which fluid can flow through the check valve and a second closed position in which fluid cannot flow through the check valve. The check valve assembly preferably further includes a shaft and at least one bearing, which is in the form of a cylindrical sleeve, to connect the valve plate to the valve body.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, the disclosure sets out a valve assembly that includes a valve body defining an internal region, an inlet passageway, and an outlet passageway, wherein the inlet and outlet passageways fluidly communicate with the internal region. A valve seat is positioned within the internal region defining a fluid passageway. A hanger is connected to the valve body. A linkage assembly is pivotally and rotatably to the hanger and a valve member is pivotally connected to the hanger via the linkage assembly, wherein the valve member is movable between an open configuration, in which fluid flow is permitted through the fluid passageway, and a closed configuration, in which the valve member engages the valve seat to at least partially restrict fluid flow through the fluid passageway.

DETAILED DESCRIPTION

Figure 1A:
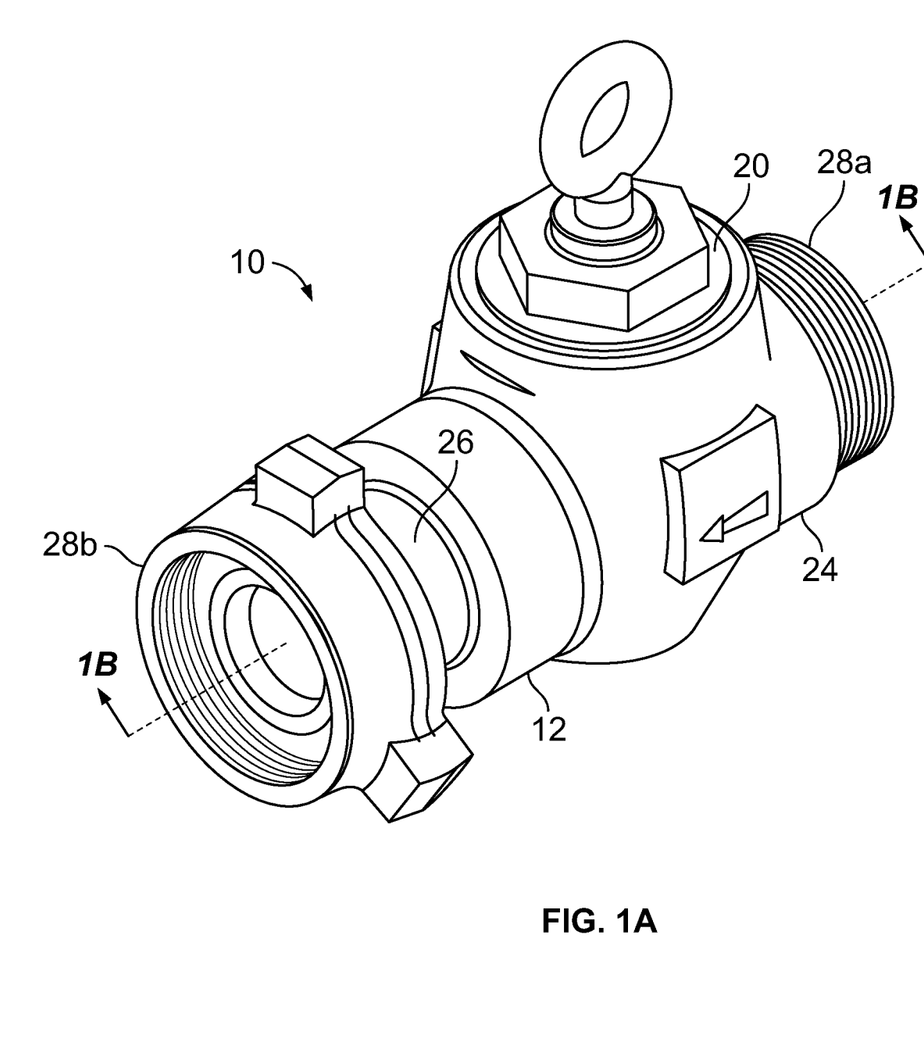
FIG. 1A is a perspective view of a clapper valve.
Figure 1B:
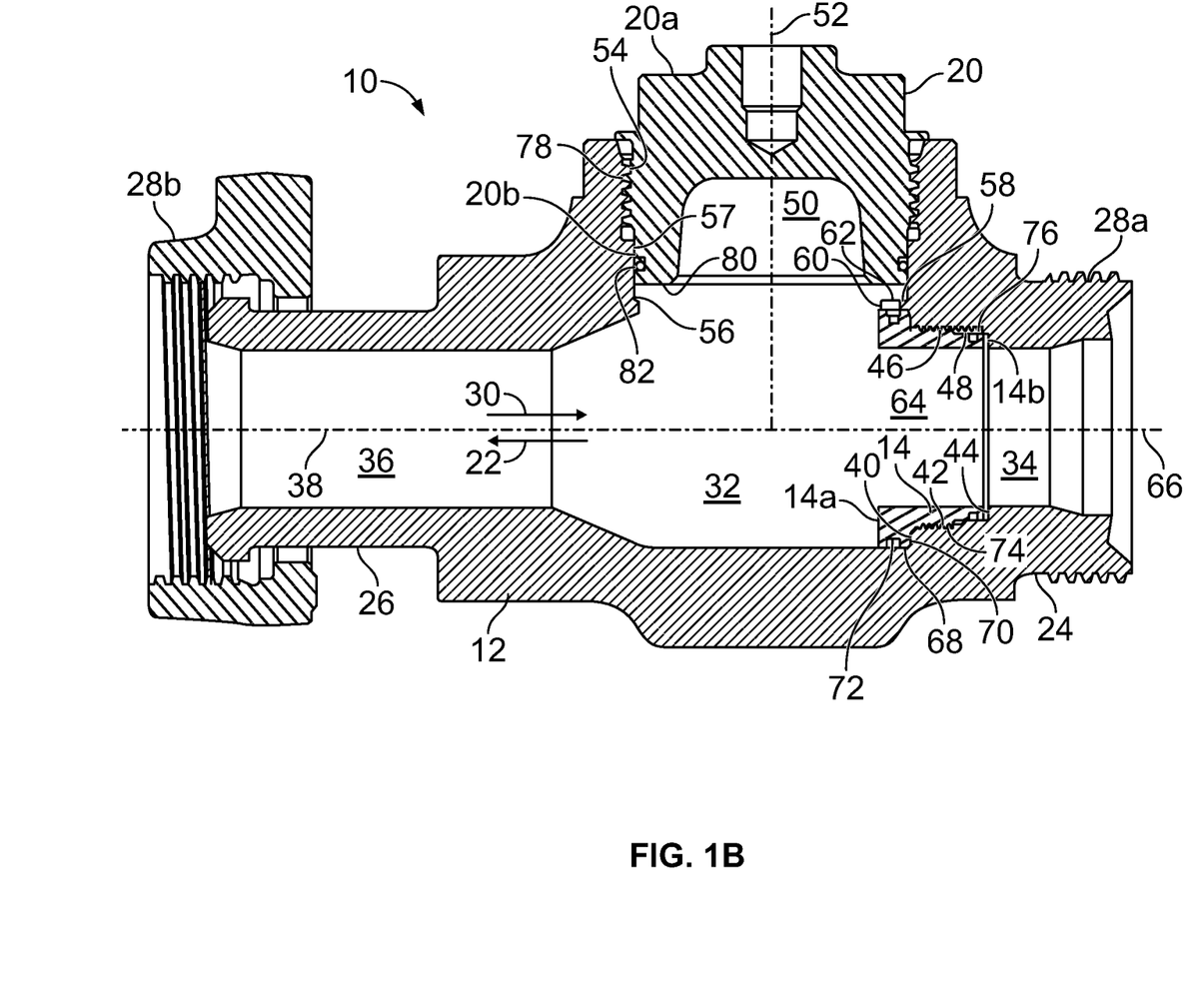
FIG. 1B is a cross section view through 1B-1B of FIG. 1A.
Figure 2:
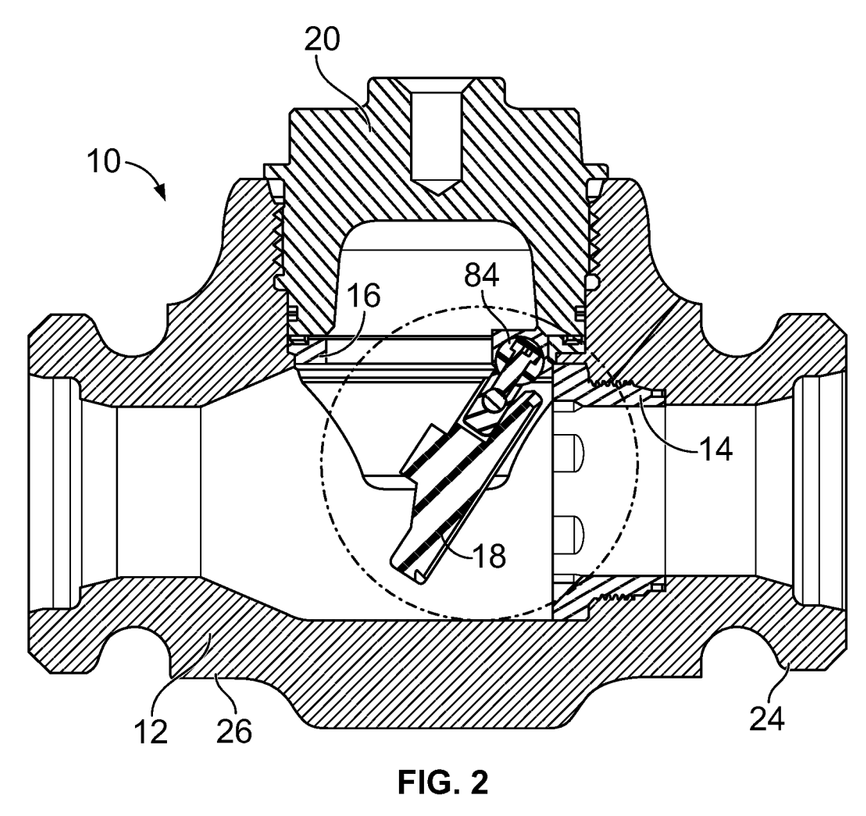
FIG. 2 is a cross section view similar to that of FIG. 1B of a clapper, hanger, and linkage assembly according to the disclosure.

Now referring to the drawings, wherein like elements refer to like reference numbers, there is illustrated initially in FIGS. 1A, 1B and FIG. 2, an example embodiment of a valve assembly, in this example a clapper valve, generally referred to by the reference numeral 10. The clapper valve 10 includes a valve body 12; a valve seat 14 formed in or connected to the valve body 12; a hanger 16 positioned within the valve body 12 proximate the valve seat 14; a valve member in the form of a clapper 18 pivotally connected to the hanger 16, via a linkage assembly 84 (FIG. 2). The clapper 18 is movable between an open configuration, in which fluid flow is permitted through the valve body 12, and a closed configuration, in which the clapper is seated against the valve seat 14 to at least partially restrict fluid flow through the valve body 12; and a cap 20 connected to the valve body 12 to secure the hanger 16 in position relative to the valve seat 14 and close the valve body. The hanger 16, clapper 18, and linkage assembly 84 are shown positioned within the clapper valve 10 in FIG. 2, and are shown in more detail in FIGS. 3-7, the description of which follows the description of FIGS. 1A, 1B and FIG. 2.

The clapper valve 10 is adapted to be incorporated into a flow line through which fluid may ordinarily flow in an axial direction 22. Accordingly, the valve body 12 includes an inlet end 24 and an outlet end 26. A pair of flow line connectors 28a and 28b may be associated with the inlet and outlet ends 24 and 26, respectively, of the valve body 12. The flow line connectors 28a and 28b are configured to couple the valve body 12 in the flow line so that fluid flow through the valve body 12 is permitted in the axial direction 22 and prevented, or at least reduced, in an axial direction 30, which is opposite the axial direction 22.

In embodiments, at least one of the flow line connectors 28a and 28b may be a male half of a hammer union. In embodiments, at least one of the flow line connectors 28a and 28b is a female half of a hammer union. As shown in FIGS. 1A and 1B, in an example embodiment, the flow line connector 28a is a female half of a hammer union, and the flow lire connector 28b is a male half of a hammer union. In embodiments, at least one of the flow line connectors 28a and 28b is, includes, or is part of another type of flow line connector having components that are not associated with a hammer union such as, for example, components associated with a hammerless union, flanges, fasteners, welds, clamps, other components, or any combination thereof.

As shown in FIG. 1B, the valve body 12 defines an internal chamber 32 within which at least respective portions of the valve seat 14, the hanger 16, and the clapper 18 extend. The valve body 12 further includes inlet and outlet passageways 34 and 36 intersecting the internal region or chamber 32. In several example embodiments, the inlet passageway 34 and the outlet passageway 36 extend substantially co-axially along an axis 38. An internal shoulder 40 is formed at the junction between the internal chamber 32 and the inlet passageway 34, facing generally in the axial direction 22. In several example embodiments, the internal shoulder 40 lies in a plane that is substantially perpendicular to the axis 38. A counterbore 42 is formed in the internal shoulder 40. The counterbore 42 extends from the internal shoulder 40 in the axial direction 30 to a counterbore shoulder 44 formed in the valve body 12. The counterbore shoulder 44 faces generally in the axial direction 22. Moreover, in embodiments, the counterbore shoulder 44 lies in a plane that is substantially perpendicular to the axis 38. An internal threaded connection 46 is formed in the valve body 12 at the counterbore 42. In embodiments, a generally cylindrical surface 48 is formed in the interior of the valve body 12, axially between the internal threaded connection 46 and the counterbore shoulder 44.

An access bore 50 is formed in the valve body 12 and intersects the internal chamber 32. In embodiments, the access bore 50 extends along an axis 52 that is substantially perpendicular to the axis 38 of the inlet and outlet passageways 34 and 36. An internal threaded connection 54 is formed in the valve body 12 at the access bore 50. Moreover, the access bore 50 includes an internal shoulder 56 in the valve body 12, facing generally toward the internal threaded connection 54. In embodiments, the internal shoulder 56 lies in a plane that is substantially perpendicular to the axis 52. In embodiments, a generally cylindrical surface 57 is formed in the interior of the valve body 12, axially between the internal threaded connection 54 and the internal shoulder 56.

The internal shoulder 56 includes a ledge 58 along a side of the internal shoulder 56 adjacent the counterbore 42. The ledge 58 has a greater width or radial dimension relative to the axis 52 than the remainder of the internal shoulder 56. The width or radial dimension of the ledge 58 is the distance, along a radial line intersecting the axis 52, between the sidewall of the access bore 50 and an edge 60 of the ledge 58. The edge 60 of the ledge 58 defines a straight profile. In embodiments, the edge 60 of the ledge 58 lies perpendicular to, or substantially perpendicular to, the axis 38 of the inlet and outlet passageways 34 and 36. Alternatively, the edge 60 of the ledge 58 may define a curvilinear profile. One or more openings 62 extends through the ledge 58 into the internal chamber 32. In several example embodiments, at least one of the openings 62 are threaded holes.

The valve seat 14 includes opposing end faces 14a and 14b. A fluid passageway 64 extends through the valve seat 14 along an axis 66, which axis 66 is substantially co-axial with the axis 38. In embodiments, the end faces 14a and 14b lie in a plane that is substantially perpendicular to the axis 66. The valve seat 14 includes a flange 68 formed in the exterior thereof, proximate the end face 14a. The flange 68 includes the end face 14a of the valve seat 14 and an external shoulder 70 that faces generally in the axial direction 30. In embodiments, the external shoulder 70 lies in a plane that is substantially perpendicular to the axis 66. An external annular recess 72 is formed in the flange 68, axially between the end face 14a and the external shoulder 70. The external annular recess 72 is adapted to be aligned with the one or more openings 62 in the ledge 58. The valve seat 14 also includes an external threaded connection 74 extending axially between the external shoulder 70 and the end face 14b. The external threaded connection 74 of the valve seat 14 is adapted to be threadably engaged with the internal threaded connection 46 of the valve body 12. In embodiments, an external annular groove 76 is formed in the valve seat 14, axially between the external threaded connection 74 and the end face 14b. The groove 76 is configured to receive a seal.

The cap 20 includes opposing end portions 20a and 20b and an external threaded connection 78 extending axially between the end portions 20a and 20b. The external threaded connection 78 of the cap 20 is adapted to be connected to the internal threaded connection 54 of the valve body 12. Further, the cap 20 includes an end face 80 at the end portion 20b thereof. An external annular groove 82 is formed in the cap 20, axially between the external threaded connection 78 and the end face 80. The groove 82 is configured to receive a seal.

The cap 20 is adapted to secure the installed hanger 16 and the clapper 18 within the valve body 12 when the external threaded connection 78 of the cap 20 is threadably engaged with the internal threaded connection 54 of the valve body 12, as will be discussed in further detail below. In embodiments, the internal threaded connection 54 of the valve body 12 and the external threaded connection 78 of the cap 20 are omitted or are replaced by other connections utilizing, for example, flanges, fasteners, welds, clamps, or the like. It will be understood that the illustrated specifics of the disclosed valve 10 are exemplary in nature and may be altered so long as the valve can accommodate and permit the operation of the hanger 16 and clapper 18 of the present disclosure.

Figure 3:
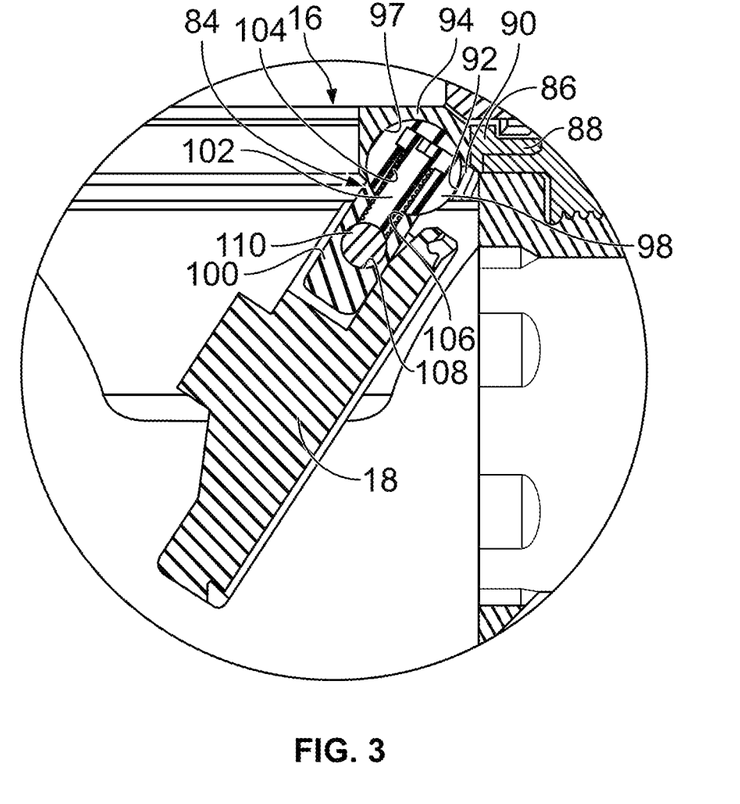
FIG. 3 is a close up view of the clapper, hanger, and linkage assembly of FIG. 2.
Figure 4:
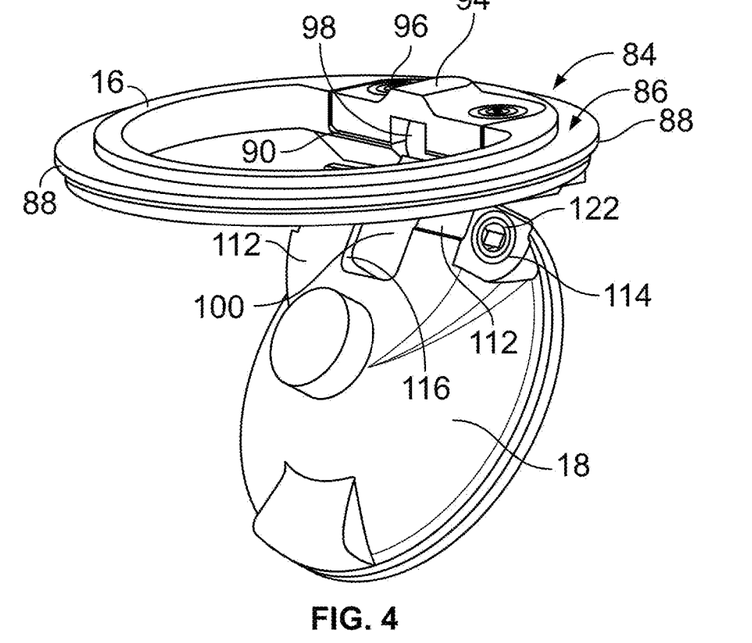
FIG. 4 is a perspective view of the clapper, hanger, and linkage assembly of FIG. 3.

Referring to FIGS. 3-7, a hanger 16, clapper 18, and linkage assembly 84 according to the disclosure is shown. FIG. 4 shows the shape of the hanger 16, which has a generally annular body 86 that includes a flange 88 that extends radially outwardly. When installed the flange 88 of the hanger 16 rests upon the internal shoulder 56 (FIG. 1B) and is held in place in the bore 50 by the cap 20. Other methods of attaching the hanger 16 to the valve body 12 are contemplated.

Figure 5:
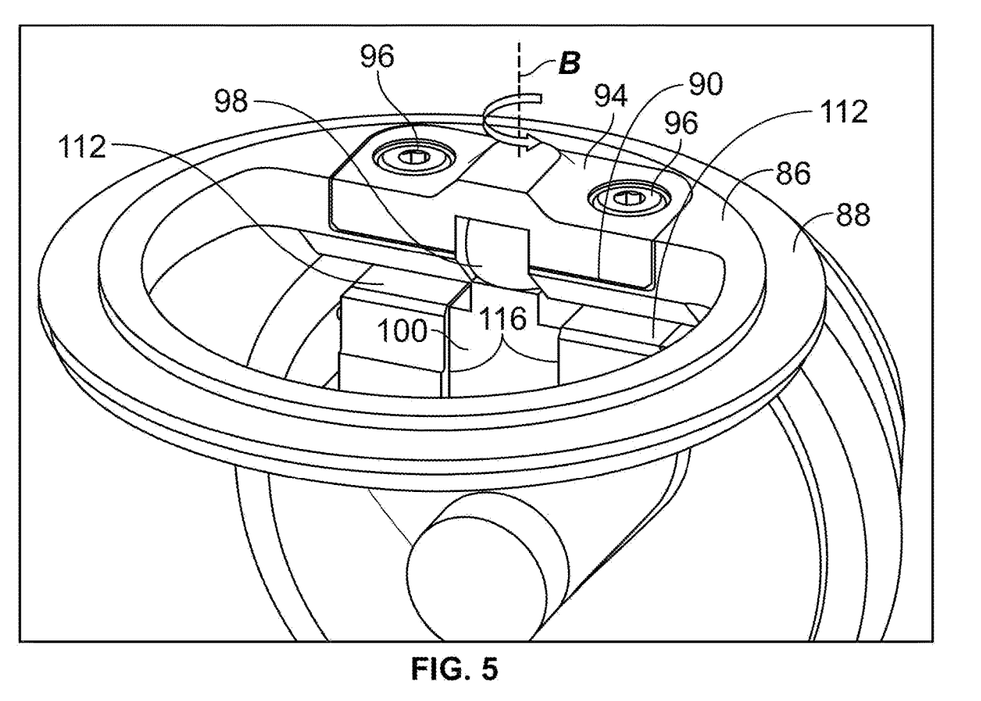
FIG. 5 is a perspective close up view of the clapper, hanger, and linkage assembly of FIG. 3.
Figure 6:
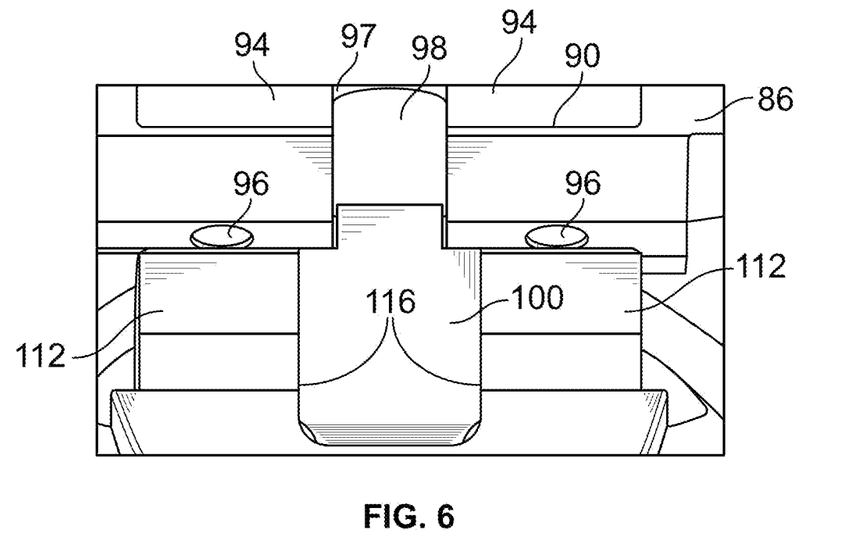
FIG. 6 is a close up perspective view, taken from below a plane of the hanger, of the linkage assembly of FIG. 3.
Figure 7:
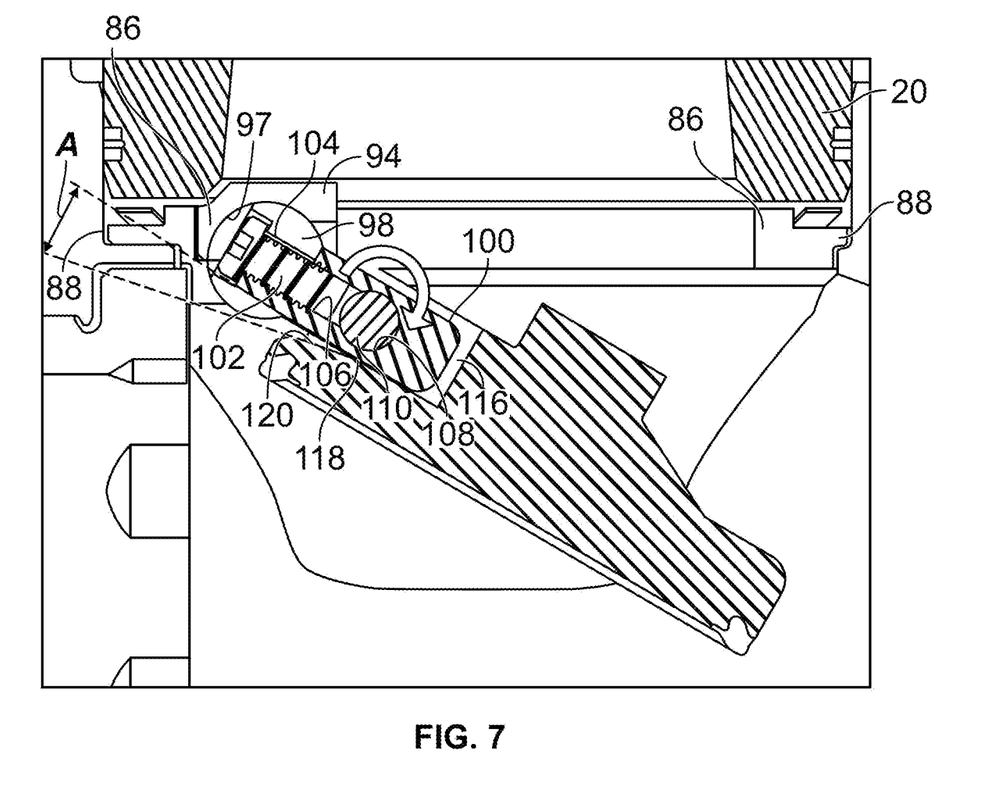
FIG. 7 is side section view of the clapper, hanger, and linkage assembly of FIG. 3.

The hanger 16 includes a seat 90, best seen in FIGS. 3, 5, and 7, which may be a generally rectangular recess in the body 86. The seat 90 has a convexity 92, which may be formed in the body 86 in a generally mid-portion of the recess. The convexity 92 may be semi-circular. The hanger 16 also includes a retainer 94 that fastens to the seat 90. The retainer 94 may be fastened to the body 86 with a pair of spaced-apart fasteners 96 which may be threaded, such as bolts or screws.

The retainer 94 is shaped and sized to cooperate with the convexity 92 of the seat 90 to define a spherical cavity 97 or socket. In the spherical cavity 97 a linkage ball 98 of the linkage assembly 84 is positioned. The linkage ball 98 is configured to move in the spherical cavity 97 in the fashion of a ball and socket arrangement or configuration. In other words, the linkage ball 98 may rotate in the socket or the linkage ball may pivot in the socket. The movement of the linkage ball 98 may be one or both of pivoting and rotating. A link 100 of the linkage assembly is attached to the linkage ball 98, in embodiments, by a threaded fastener 102 engaged with a ball bore 104 formed through the linkage ball 98 and a link bore 106 formed in the link 100. The link 100 may be generally rectangular and elongate. The ball bore 104 is formed through the ball 98 and the link bore 106 may be a blind hole. While it is conceivable that the linkage ball and link 98, 100 could be formed as a one piece construction, desirable movement of the clapper 18 relative to the hanger 16 is achieved reliably with a linkage ball 98 fit to the cavity 97 with the ball having a high degree of smoothness and roundness as would be desired in a ball bearing, for example. Therefore, in embodiments, the linkage ball 98 and the link 100 are formed separately and then coupled together with the fastener 102. It will be understood that other means of attaching the linkage ball 98 to the hanger 16 or, in the alternative, to some other part of the valve body 12, is also contemplated.

At an end opposite the link bore 106 a pivot bore 108 is formed transversely through the link 100 relative to the link bore. A pivot pin 110 is positioned in the pivot bore 108. The clapper 18 has a fork 112 that is shaped and sized to receive part of the link 100 opposite the linkage ball 98. The fork 112 defines a slot 116 that receives the link 100 such that the link is positioned within the fork 112. The slot 116 may be generally rectangular with a stop face 120 that deviates away from a fulcrum 118 formed in the slot. The deviation of the stop face 120 may be, without limitation thereto, about 3 degrees (see "A" in FIG. 7) for example, away from a plane that would define a flat bottom to the slot 116. The configuration of the stop face 120 and link 100 permits the clapper 18 to pivot about the pivot pin 110 a selected number of degrees "A" and self-align to the valve seat 14.

The fork 112 has a fork bore 114 that aligns with the pivot bore 108 and is configured to receive the ends of the pivot pin 110. The pivot pin 110 has a length that enables the pivot pin 110 to extend from the sides of the link 100 into the fork bore 114. The pivot pin 110 may be retained in the fork 112 with set screws 122 installed in the ends of the fork bore 114, essentially trapping the pin 110 in the fork U. When assembled, the clapper 18 is pivotally secured via the link 100 to the hanger 16.

The hanger 16, clapper 18, and linkage assembly 84 are configured, as shown in FIG. 5, to permit a selected amount of movement about the axis "B". In embodiments, there may be about 3 degrees of movement, provided at least in part by movement of the ball 98 in the cavity 97. Other amounts of movement are contemplated. The clapper 18 also moves about pin 110 by pivoting about 3 degrees as shown in FIG. 7 at "A." The amount of movement designed into the connection of the clapper 18 to the hanger 16 ensures that the clapper is permitted to align with and seal reliably to the valve seat 14 (FIG. 2) despite the challenging conditions generated inside the clapper valve 10 by the flow of material through the valve.

INDUSTRIAL APPLICABILITY

The industrial applicability of the system described herein will be readily appreciated from the forgoing discussion. The foregoing discussion is applicable to clapper valves and methods of enabling a selected amount of movement of the clapper portion of the valves to ensure reliable seating of the clapper on a valve seat while providing a robust connection of the clapper to a hanger of the clapper valve.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A valve assembly, comprising:
   a valve body defining an internal region, an inlet passageway, and an outlet passageway, wherein the inlet and outlet passageways fluidly communicate with the internal region;
   a valve seat positioned within the internal region and defining a fluid passageway;
   a hanger connected to the valve body, wherein the hanger includes:
   an annular body;
   a through-hole that extends through the annular body; and
   a seat defined as a recess in the annular body;
   a retainer located within the seat to define a spherical cavity facing the through-hole;
   a linkage assembly pivotally and rotatably attached to the hanger; and
   a valve member pivotally connected to the hanger via the linkage assembly, wherein the valve member is movable between an open configuration, in which fluid flow is permitted through the fluid passageway, and a closed configuration, in which the valve member engages the valve seat to at least partially restrict fluid flow through the fluid passageway.

2. The valve assembly of claim 1 wherein the valve member includes a clapper.

3. The valve assembly of claim 2 wherein the hanger, clapper, and linkage assembly are configured to permit a selected amount of relative movement of the clapper relative to the hanger.

4. The valve assembly of claim 1 wherein the linkage assembly comprises a linkage ball that is positioned in the spherical cavity.

5. The valve assembly of claim 4 wherein the linkage assembly comprises a link attached to the valve member and to the linkage ball.

6. The valve assembly of claim 5 wherein the seat comprises a convexity that is shaped and sized to receive the linkage ball.

7. The valve assembly of claim 6 wherein the retainer attaches to the hanger and the spherical cavity encloses at least a portion of the linkage ball cooperatively with the convexity of the seat, while permitting the linkage ball to move relative to the hanger.

8. The valve assembly of claim 7 wherein the spherical cavity and the linkage ball are configured as a ball and socket.

9. The valve assembly of claim 8 wherein the ball and socket permits both rotational and angular displacements of the ball in the socket.

10. The valve assembly of claim 4 wherein the linkage assembly comprises a link attached to the linkage ball.

11. The valve assembly of claim 10 wherein the link is attached to the linkage ball via a threaded fastener.

12. The valve assembly of claim 10 wherein the link includes a pivot bore, wherein a pivot pin is movably disposed in the pivot bore and attaches the link to the valve member.

13. The valve assembly of claim 12 wherein the link is attached to the valve member so as to permit the valve member to pivot about the pivot pin a selected amount.

14. The valve assembly of claim 13 wherein the selected amount is three degrees.

15. The valve assembly of claim 1 wherein the valve body further defines an access bore in fluid communication with the internal region.

16. The valve assembly of claim 15 wherein the hanger is disposed across the access bore.

17. A valve assembly comprising:
a valve body defining an internal region, an inlet passageway, and an outlet passageway, wherein the inlet and outlet passageways fluidly communicate with the internal region;
a valve seat positioned within the internal region and defining a fluid passageway;
a hanger connected to the valve body, the hanger having an annular body, the hanger defining a through-hole through the annular body;
a linkage assembly pivotally and rotatably attached to the hanger wherein the linkage assembly includes:
a linkage ball movably attached to the hanger and surrounded by the annular body of the hanger; and
a link attached to the linkage ball, wherein the link includes a pivot bore, and wherein a pivot pin is movably disposed in the pivot bore; and
a valve member pivotally connected to the hanger via the linkage assembly, wherein the valve member is movable between an open configuration, in which fluid flow is permitted through the fluid passageway, and a closed configuration, in which the valve member engages the valve seat to at least partially restrict fluid flow through the fluid passageway,
wherein the valve member includes a fork and a fork bore formed through the fork, wherein the pivot bore is aligned with the fork bore when the link is assembled to the valve member, and wherein the pivot pin attaches the link to the valve member and is configured to extend into the fork bore of the fork.

18. The valve assembly of claim 17 wherein the valve member includes a stop that permits the link to pivot about the pivot pin about 3 degrees.

19. The valve assembly of claim 17 further comprising a pair of set screws positioned in the fork bore of the fork so as to retain the pivot pin in the fork bore and when installed, prevents the valve member from being detached from the linkage assembly.

20. A valve assembly, comprising:
a valve body defining:
an internal region;
an inlet passageway;
an outlet passageway; and
an access bore connected between the inlet passageway and the outlet passageway, the access bore extending orthogonally with respect to the inlet passageway and the outlet passageway;
a cap within the access bore of the valve body,
wherein the inlet and outlet passageways fluidly communicate with the internal region;
a valve seat positioned within the internal region and defining a fluid passageway;
a hanger connected to the valve body, the hanger including a recess and a retainer attached to the hanger in the recess to define a spherical cavity disposed within the access bore of the valve body;
a linkage assembly pivotally and rotatably attached to the hanger, the linkage assembly including a linkage ball that is positioned in the spherical cavity; and
a valve member pivotally connected to the hanger via the linkage assembly, wherein the valve member is movable between an open configuration, in which fluid flow is permitted through the fluid passageway, and a closed configuration, in which the valve member engages the valve seat to at least partially restrict fluid flow through the fluid passageway.

* * * * *